(12) United States Patent
Choi

(10) Patent No.: US 9,862,346 B2
(45) Date of Patent: Jan. 9, 2018

(54) AIRBAG SYSTEM FOR VEHICLE

(71) Applicant: Hyundai Motor Company, Seoul (KR)

(72) Inventor: Jun Yeol Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/045,564

(22) Filed: Feb. 17, 2016

(65) Prior Publication Data

US 2017/0129442 A1 May 11, 2017

(30) Foreign Application Priority Data

Nov. 6, 2015 (KR) .................. 10-2015-0155810

(51) Int. Cl.

| *B60R 21/0134* | (2006.01) |
| *B60R 21/0136* | (2006.01) |
| *B60R 21/015* | (2006.01) |
| *B60R 21/214* | (2011.01) |
| *B60R 21/232* | (2011.01) |
| *B60N 2/00* | (2006.01) |
| *B60N 2/02* | (2006.01) |
| *B60R 21/01* | (2006.01) |
| *B60R 21/231* | (2011.01) |

(52) U.S. Cl.

CPC ............ *B60R 21/214* (2013.01); *B60N 2/002* (2013.01); *B60N 2/0244* (2013.01); *B60N 2/0276* (2013.01); *B60R 21/0134* (2013.01); *B60R 21/0136* (2013.01); *B60R 21/01512* (2014.10); *B60R 21/01554* (2014.10); *B60R 21/232* (2013.01); *B60R 2021/01286* (2013.01); *B60R 2021/23153* (2013.01)

(58) Field of Classification Search
None
See application file for complete search history.

(56) References Cited

U.S. PATENT DOCUMENTS

| 2005/0127645 A1* | 6/2005 | Smith | B60N 2/015 |
| | | | 280/730.2 |
| 2006/0261579 A1* | 11/2006 | Breed | B60R 21/205 |
| | | | 280/729 |
| 2008/0125940 A1* | 5/2008 | Breed | B60R 21/013 |
| | | | 701/45 |
| 2009/0243353 A1* | 10/2009 | Sakai | B60N 2/0244 |
| | | | 297/216.1 |
| 2010/0314859 A1* | 12/2010 | Tomitaka | B60R 21/207 |
| | | | 280/730.2 |
| 2012/0080869 A1* | 4/2012 | Lee | B60R 21/214 |
| | | | 280/729 |

(Continued)

FOREIGN PATENT DOCUMENTS

| JP | H10264761 A | 10/1998 |
| KR | 10-1999-0017534 A | 3/1999 |

(Continued)

*Primary Examiner* — Rami Khatib
(74) *Attorney, Agent, or Firm* — Mintz Levin Cohn Ferris Glovsky and Popeo, P.C.; Peter F. Corless

(57) ABSTRACT

An airbag system for a vehicle is provided that prevents a passenger seated in each seat from being struck and injured by a roof airbag when the roof airbag is deployed in the event of vehicle collision. In addition, the airbag system for a vehicle secures safety by effectively protecting the passenger using the roof airbag.

12 Claims, 5 Drawing Sheets

(56) References Cited

U.S. PATENT DOCUMENTS

| | | | | |
|---|---|---|---|---|
| 2012/0133114 A1* | 5/2012 | Choi | ................... | B60R 21/214 |
| | | | | 280/728.2 |
| 2013/0069348 A1* | 3/2013 | Choi | ................... | B60R 21/214 |
| | | | | 280/730.2 |
| 2013/0087995 A1* | 4/2013 | Lee | ..................... | B60R 21/214 |
| | | | | 280/728.2 |
| 2014/0309806 A1* | 10/2014 | Ricci | ...................... | B60Q 1/00 |
| | | | | 701/1 |

FOREIGN PATENT DOCUMENTS

| KR | 20-1999-0027023 U | 7/1999 |
|---|---|---|
| KR | 2001-0001842 A | 1/2001 |
| KR | 2004-0072836 A | 8/2004 |
| KR | 2014-0011833 A | 1/2014 |

\* cited by examiner

AIRBAG SYSTEM FOR VEHICLE

CROSS REFERENCE TO RELATED APPLICATION

The present application claims priority of Korean Patent Application No. 10-2015-0155810 filed on Nov. 6, 2015, the entire contents of which is incorporated herein for all purposes by this reference.

BACKGROUND

Field of the Invention

The present invention relates to an airbag system for a vehicle, capable of preventing a collision between passengers seated in front and rear seats in the event of vehicle collision.

Description of the Related Art

In addition to technologies regarding driving performance, convenience, and functionality of vehicles, technologies for securing the safety of passengers have also been developed. In particular, airbags from among a variety of safety devices applied to vehicles are applied as the most effective device for protecting impact on passengers.

Particularly, airbags protect drivers and passengers in the event of vehicle collision and each include a crash sensor configured to detect vehicle collision, a controller which operates the airbag based on the result detected by the crash sensor, and an airbag module which operates the airbag in response to signals from the controller. The airbags are classified into a driver airbag, a passenger airbag, a side airbag, a roof airbag, which is also called as a center airbag, etc. according to installation positions or objects to be protected.

The roof airbag includes an inflator mounted to a roof rail, an air cushion connected to the inflator to be inflated by working gas introduced into a diffuser and then discharged therefrom, and a controller configured to operate the inflator based on whether a collision is detected. The roof airbag is deployed between front and rear seats to protect a rear passenger. However, such a roof airbag is problematic in that it is merely deployed regardless of whether passengers are within the vehicle. In addition, since the roof airbag is deployed regardless of the positions of seats, a passenger seated in the front seat may be struck and injured by the deployed roof airbag.

The foregoing is intended merely to aid in the understanding of the background of the present invention, and is not intended to mean that the present invention falls within the purview of the related art that is already known to those skilled in the art.

SUMMARY

Accordingly, the present invention provides an airbag system for a vehicle, capable of preventing a passenger seated in each seat from being struck and injured by a roof airbag, which is also called as a center airbag, when the roof airbag is deployed in the event of vehicle collision. In addition, the present invention provides an airbag system for a vehicle, capable of securing safety by effectively protecting a passenger using a roof airbag.

In accordance with one aspect of the present invention, an airbag system for a vehicle may include a surrounding vehicle detection unit configured to sense a surrounding vehicle and detect driving information of the surrounding vehicle, a passenger detection unit configured to detect whether a passenger or baggage is present in each of front and rear seats, an impact detection unit configured to detect an impact applied to a vehicle, a seat adjustment unit configured to detect and adjust positions of the front and rear seats, a center airbag mounted to a roof between the front and rear seats, and a controller configured to operate the seat adjustment unit to move each of the front and rear seats to a predetermined set position when the controller determines that the vehicle collides based on a signal detected by the surrounding vehicle detection unit and determines that the passenger or baggage is present in the rear seat, and configured to transmit a signal to the center airbag to deploy the center airbag when the controller determines that the impact is applied to the vehicle.

The set position pre-stored in the controller may be an initial seat design position at which the center airbag does not interfere with the front seat when the center airbag is deployed. The controller may be configured to detect and confirm the position of the front seat using the seat adjustment unit when the vehicle is predicted to collide and the passenger or baggage is located in the rear seat, and operate the seat adjustment unit to move the front seat to the set position when the front seat is not located at the set position. Additionally, the controller may be configured to shorten a deployment time of the center airbag when the front seat is located in front of the set position, and delay the deployment time of the center airbag when the front seat is located behind the set position. The controller may further be configured to pre-store a limit position of the front seat, and transmit a signal to the center airbag to prevent the center airbag from deploying when the front seat is located behind the limit position.

The seat adjustment unit may be configured to detect an angle of each seat back of the front and rear seats to adjust a position of the seat back, and when the vehicle is predicted to collide and the passenger or baggage is located in the rear seat, the controller may be configured to operate the seat adjustment unit to adjust the seat back of the front seat to a predetermined reference angle. The reference angle pre-stored in the controller may be an initial design angle at which the center airbag does not interfere with the seat back of the front seat when the center airbag is deployed.

The controller may further be configured to shorten a deployment time of the center airbag when the seat back of the front seat is inclined forward at an angle greater than the reference angle, and delay the deployment time of the center airbag when the seat back of the front seat is inclined rearward at an angle greater than the reference angle. The controller may be configured to pre-store a limit angle of the seat back of the front seat, and transmit a signal to the center airbag to prevent the center airbag from deploying when the seat back of the front seat is inclined rearward at an angle greater than the limit angle.

The airbag system may further include a pre-tensioning unit configured to pull each safety belt of the front and rear seats in response to a signal received from the controller and the controller may be configured to transmit an operational signal to the pre-tensioning unit to pull the safety belt when the vehicle is predicted to collide. The airbag system may further include a warning notification unit configured to provide a collision warning in response to a signal received from the controller, and the controller may be configured to provide a notification to the passenger when the vehicle is predicted to collide. The center airbag may be located adjacent to a rear of a seat back of the front seat when the front seat is located at the set position when the center airbag is deployed. The controller may be configured to operate the seat adjustment unit to move the rear seat rearward when the vehicle is predicted to collide.

As apparent from the above description, an airbag system for a vehicle according to the present invention may prevent a passenger seated in each seat from being struck and injured by a roof airbag when the roof airbag is deployed in the event of vehicle collision. In addition, it may be possible to secure safety by effectively protecting a passenger using the roof airbag.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
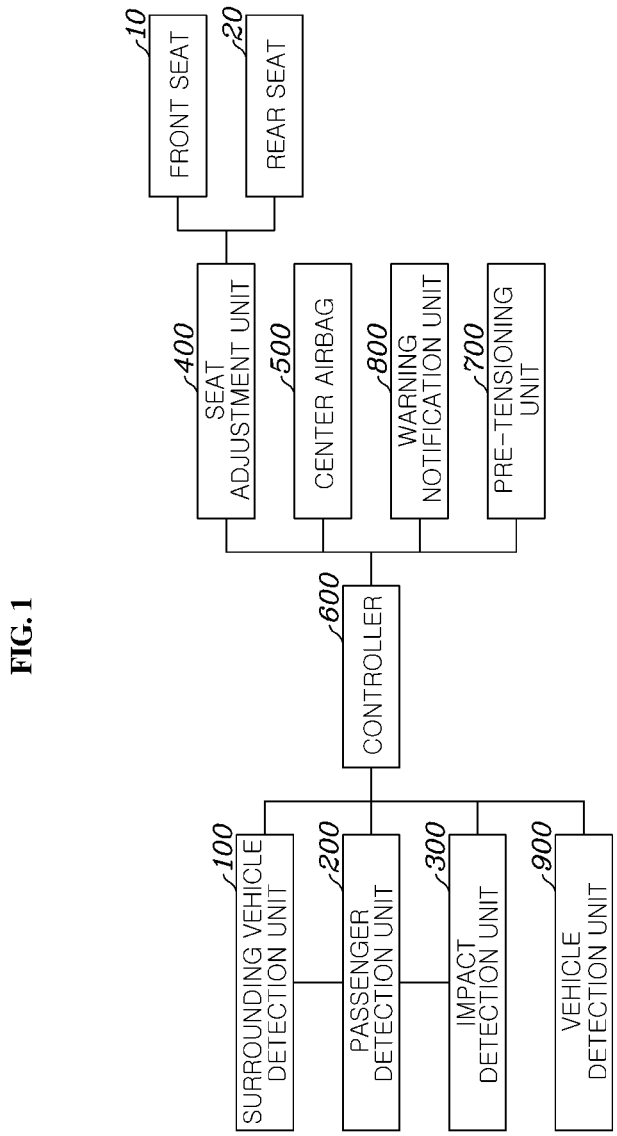
FIGS. 1 and 2 are views illustrating a configuration of an airbag system for a vehicle according to an exemplary embodiment of the present invention.
Figure 2:
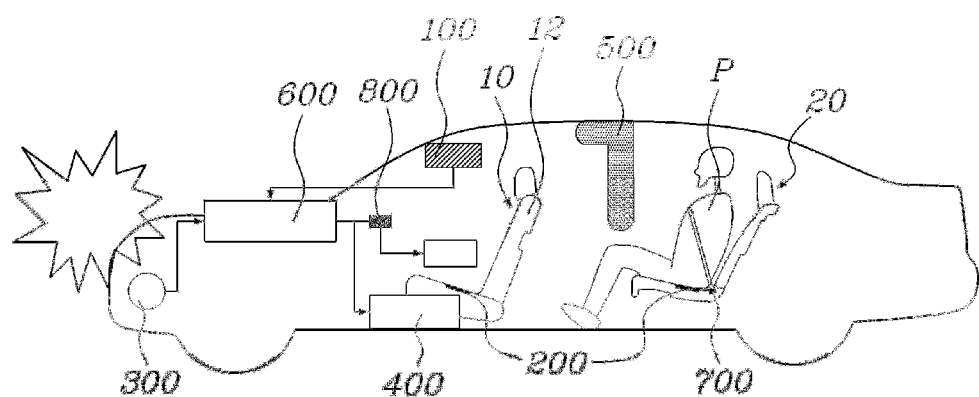

An airbag system for a vehicle according to the exemplary embodiments of the present invention will be described below with reference to the accompanying drawings. FIGS. 1 and 2 are views illustrating a configuration of an airbag system for a vehicle according to an exemplary embodiment of the present invention. FIGS. 3 to 7 are views illustrating the airbag system for a vehicle illustrated in FIG. 1.

Figure 3:
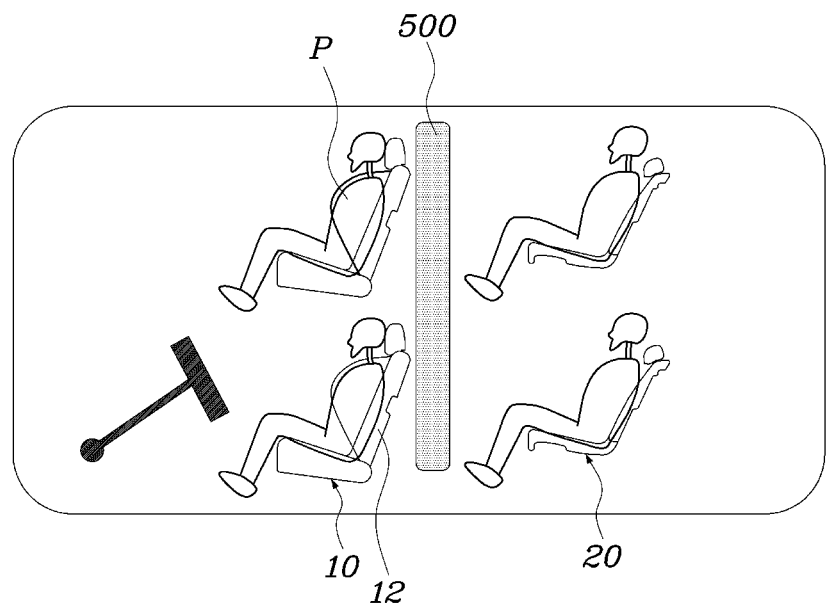
FIGS. 3 to 7 are views illustrating the airbag system for a vehicle illustrated in FIG. 1 according to an exemplary embodiment of the present invention.

As illustrated in FIGS. 1 to 3, the airbag system for a vehicle according to the exemplary embodiment of the present invention may include a surrounding vehicle detection unit 100 (e.g., a sensor) configured to sense a surrounding vehicle and detect driving information regarding the surrounding vehicle, a passenger detection unit 200 (e.g., a sensor) configured to detect whether a passenger P or baggage is present in each of front and rear seats 10 and 20, an impact detection unit 300 (e.g., a sensor) configured to detect an impact applied to a vehicle, a seat adjustment unit 400 (e.g., a sensor) configured to detect and adjust the positions of the front and rear seats 10 and 20, a center airbag 500 mounted to a roof between the front and rear seats 10 and 20, and a controller 600 configured to operate the seat adjustment unit 400 to dispose each of the front and rear seats 10 and 20 at a predetermined set position when the controller 600 predicts that the vehicle collides based on a signal detected by the surrounding vehicle detection unit 100 and determines that the passenger P or baggage is present in the rear seat 20 through the passenger detection unit 200, and may be configured to transmit a signal to the center airbag 500 to deploy the center airbag 500 when the controller 600 determines that the impact is applied to the vehicle through the impact detection unit 300.

In particular, the surrounding vehicle detection unit 100 may be configured to detect or determine the distance between a vehicle and a surrounding vehicle, the speed of a surrounding vehicle relative to a vehicle, and the position of a surrounding vehicle, and may be an imaging device or a radar. Additionally, ACC (Auto-Cruise Control; Adaptive-Cruise Control) systems, SCC (Smart Cruise Control) systems, or PCS (Pre-Crash-Safety) systems are applied to vehicles, and the driving information regarding surrounding vehicles may be input to these systems using imaging devices (e.g., cameras, video cameras, etc.) or radars.

Furthermore, the airbag system may include a vehicle detection unit 900 configured to detect a vehicle driving speed, a steering angle, an acceleration, etc. Accordingly, a vehicle speed sensor, a steering angle sensor, a yaw rate sensor, an acceleration sensor, etc. may be applied to the airbag system. Through such a configuration, the controller 600 may be configured to predict vehicle collision by receiving vehicle information from the vehicle detection unit 900 and comparing the vehicle information with the driving information regarding the surrounding vehicle input from the surrounding vehicle detection unit 100. The seat adjustment unit 400 may be configured to detect the position of the rear seat 20 to adjust the positions of the front and rear seats 10 and 20. The front and rear seats 10 and 20 may include sensors for detecting pressure, and it may thus be possible to detect whether passengers P are seated in the front and rear seats 10 and 20.

Meanwhile, the impact detection unit 300 configured to detect the impact applied to the vehicle may be a typical FIS (Front Impact Sensor) configured to detect whether an existing airbag such as a driver airbag or a passenger airbag is deployed. Through such a configuration, the controller 600 may be configured to operate the seat adjustment unit 400 to dispose each of the front and rear seats 10 and 20 at a predetermined set position when the controller 600 predicts that the vehicle collides based on the signal detected by the surrounding vehicle detection unit 100 and determines that the passenger P or baggage is present in the rear seat 20 through the passenger detection unit 200, and the controller may be configured to transmit a signal to the center airbag 500 to deploy the center airbag 500 when the controller 600 determines that the impact is applied to the vehicle through the impact detection unit 300.

In other words, when the controller 600 predicts vehicle collision and determines that the passenger P or baggage is present in the rear seat 20, the controller 600 may be configured to adjust the positions of the front and rear seats 10 and 20 to fully deploy the center airbag 500 to protect the passenger P. Particularly, the controller 600 may be configured to adjust the front and rear seats 10 and 20 to dispose each of the front and rear seats 10 and 20 at a predetermined set position. The set position may be an initial seat design position at which the center airbag 500 does not interfere with the front seat 10 when the center airbag 500 is deployed. The positions of the front seat 10 and the center airbag 500 may be typically determined to prevent the center airbag 500 from interfering with the front seat 10 when the vehicle seats and the center airbag 500 are initially designed.

Accordingly, the controller 600 may be configured to pre-store a position, at which the center airbag 500 does not interfere with the front seat 10, as the set position, thereby enabling the rear passenger P to be more stably protected by fully deploying the center airbag 500 when the center airbag 500 does not interfere with the front seat 10 in the event of vehicle collision. In addition, since the initial design position of the front seat 10 may be determined such that the center airbag 500 is adjacent a seat back 12 of the front seat 10, the fully deployed center airbag 500 may be supported by the seat back 12 of the front seat 10 and may more stably absorb an impact applied to the passenger seated in the rear seat 20 coming into contact with the center airbag 500.

Specifically, the controller 600 may be configured to detect the position of the front seat 10 using the seat adjustment unit 400 when the vehicle is predicted to collide and the passenger P or baggage is located in the rear seat 20. In particular, when the front seat 10 is not located at the set position, the controller 600 may be configured to operate the seat adjustment unit 400 to move the front seat 10 to the set position. In other words, when the controller 600 predicts that the vehicle collides using the surrounding vehicle detection unit 100 and determines that the passenger P or baggage is present in the rear seat 20 using the passenger detection unit 200, the controller 600 may be configured to move the front seat 10 to the set position to fully deploy the center airbag 500 in the event of vehicle collision.

Figure 4:
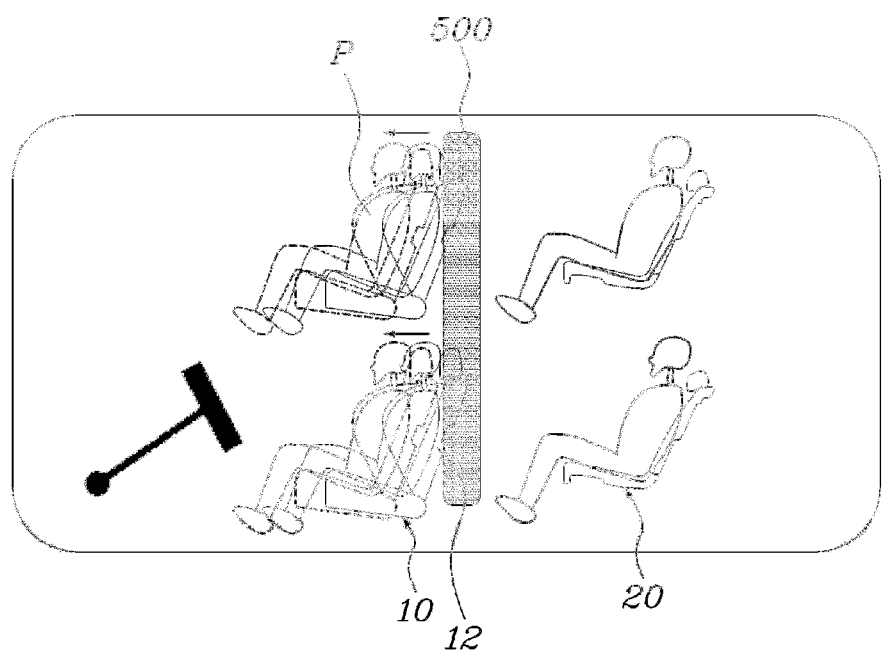

For example, when the front seat 10 is located at the set position as illustrated in FIG. 3, the center airbag 500 may be deployed more smoothly at a position adjacent to the seat back 12 of the front seat 10 and thus may be supported by the seat back 12 of the front seat 10. When the front seat 10 is located behind the set position as illustrated in FIG. 4, the controller 600 may be configured to operate the seat adjustment unit 400 and move the front seat 10 in a forward direction to cause the front seat 10 to follow (e.g. conform to) the set position, when the controller 600 predicts vehicle collision and detects the rear passenger P. Consequently, it may be possible to prevent the center airbag 500 deployed in the event of vehicle collision from interfering with the front seat 10, or from pressing the passenger P seated in the front seat 10.

Figure 5:
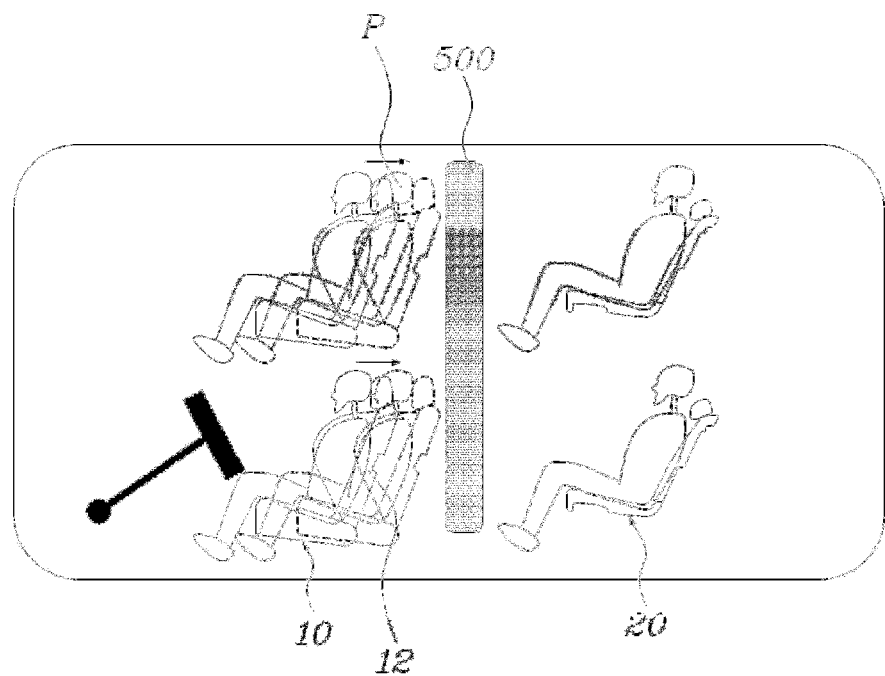

On the contrary, when the front seat 10 is located in front of the set position as illustrated in FIG. 5, the controller 600 may be configured to operate the seat adjustment unit 400 and move the front seat 10 in a rearward direction, when the controller 600 predicts vehicle collision and detects the rear passenger P. Consequently, the deployed center airbag 500 may be supported by the seat back 12 of the front seat 10, thereby enabling the passenger P to be more effectively protected.

Particularly, the controller 600 may be configured to pre-store the limit position of the front seat 10, and may be configured to transmit a signal to the center airbag 500 to prevent the center airbag 500 from being deployed when the front seat 10 is located behind the limit position. The limit position is a position which is spaced rearward from the set position as the initial seat design position by a predetermined distance. In other words, the limit position is a position at which the center airbag 500 interferes with the front seat 10 as the front seat 10 is not completely returned to the set position even when the controller 600 returns the front seat 10 to the set position by predicting vehicle collision and detecting the rear passenger P. The limit position may vary based on seat designs and specifications of motors for moving the front and rear seats 10 and 20 in the seat adjustment unit 400.

Accordingly, when the front seat 10 is located behind the limit position, the center airbag 500 may interfere with the front seat 10 even though the controller 600 moves the front seat 10 before the generation of vehicle collision. Therefore, the controller 600 may be configured to prevent the center airbag 500 from being deployed, thereby preventing the center airbag 500 from striking the passenger P seated in the front seat 10. Additionally, the controller 600 may be configured to shorten the deployment time of the center airbag 500 when the front seat 10 is located in front of the set position, and may be configured to delay the deployment time of the center airbag 500 when the front seat 10 is located behind the set position. In other words, since the deployment time of the center airbag 500 is shortened when the front seat 10 is located in front of the set position, the center airbag 500 may be first deployed and then may come into contact with the seat back 12 of the front seat 10, thereby enabling the front seat 10 to more stably support the center airbag 500. In addition, since the deployment time of the center airbag 500 may be delayed when the front seat 10 is located behind the set position, a time for which the front seat 10 is moved to the set position may be determined, with the consequence that it may be possible to prevent the center airbag 500 from interfering with the front seat 10 when the center airbag 500 is deployed.

Meanwhile, the seat adjustment unit 400 may be configured to detect the angle of each seat back 12 of the front and rear seats 10 and 20 to adjust the position of the seat back 12. When the vehicle is predicted to collide and the passenger P or baggage is located in the rear seat 20, the controller 600 may be configured to operate the seat adjustment unit 400 to adjust the seat back 12 of the front seat 10 to a predetermined reference angle.

Particularly, the reference angle pre-stored in the controller 600 may be an initial design angle at which the center airbag 500 does not interfere with the seat back 12 of the front seat 10 when the center airbag 500 is deployed. The reference angle may be an angle at which the center airbag 500 does not interfere with the seat back 12 of the front seat 10 when the center airbag 500 is deployed, in the initial stage of the seat back 12 of the front seat 10 and the center airbag 500. In other words, when the controller 600 predicts that the vehicle collides using the surrounding vehicle detection unit 100 and determines that the passenger P or baggage is present in the rear seat 20 using the passenger detection unit 200, the controller 600 may be configured to adjust the angle of the seat back 12 of the front seat 10 to the reference angle to fully deploy the center airbag 500 in the event of vehicle collision.

Figure 6:
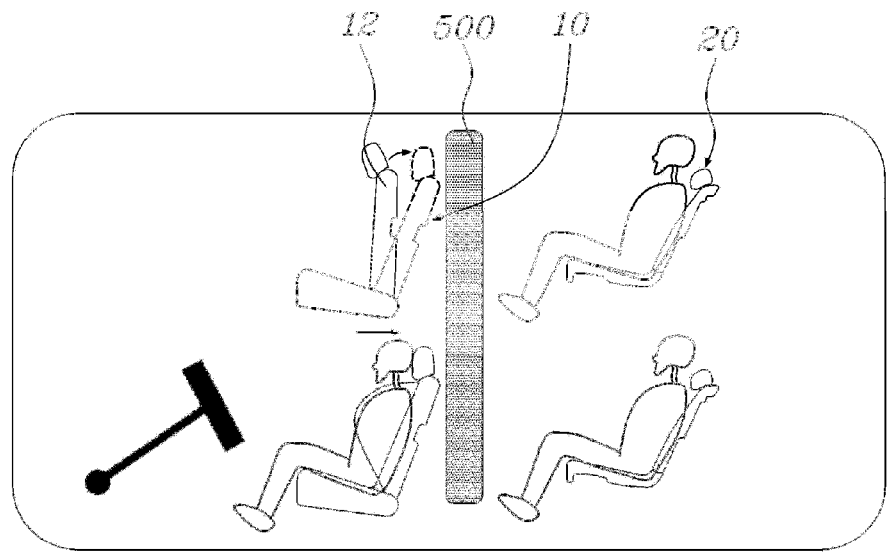

For example, when the seat back 12 of the front seat 10 is at the reference angle as illustrated in FIG. 3, the center airbag 500 may be more smoothly deployed at a position adjacent to the seat back 12 of the front seat 10 and thus may be supported by the seat back 12 of the front seat 10. When the seat back 12 of the front seat 10 is inclined rearward at an angle greater than the reference angle as illustrated in FIG. 6, the controller 600 may be configured to operate the seat adjustment unit 400 and rotate the seat back 12 of the front seat 10 in a forward direction to conform (e.g., adjust) the seat back 12 of the front seat 10 to the reference angle, when the controller 600 predicts vehicle collision and detects the rear passenger P. Consequently, it may be possible to prevent the center airbag 500 deployed in the event of vehicle collision from interfering with the front seat 10, or from pressing the passenger P seated in the front seat 10.

Figure 7:
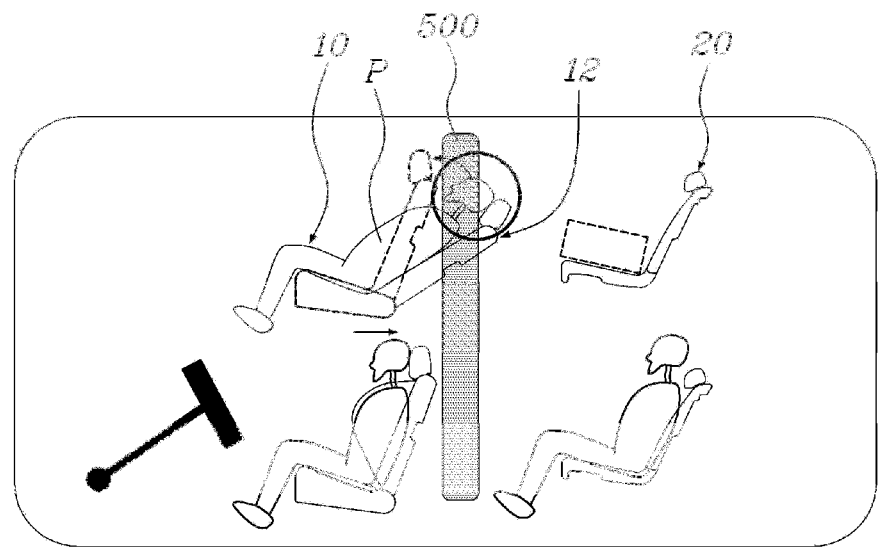

On the contrary, when the seat back 12 of the front seat 10 is inclined forward at an angle greater than the reference angle as illustrated in FIG. 7, the controller 600 may be configured to operate the seat adjustment unit 400 and rotate the seat back 12 of the front seat 10 in a rearward direction, when the controller 600 predicts vehicle collision and detects the rear passenger P. Consequently, the deployed center airbag 500 may be supported by the seat back 12 of the front seat 10, thereby enabling the passenger P to be effectively protected. In particular, the controller 600 may be configured to pre-store the limit angle of the seat back 12 of the front seat 10, and transmit a signal to the center airbag 500 to prevent the center airbag 500 from deploying when the seat back 12 of the front seat 10 is inclined rearward at an angle greater than the limit angle.

Furthermore, the limit angle may be an angle at which the seat back 12 of the seat is inclined rearward at an angle greater than the reference angle as the initial design angle. In other words, the limit angle may be an angle at which the center airbag 500 interferes with the seat back 12 of the front seat 10 as the seat back 12 of the front seat 10 is not completely returned to be at the reference angle even when the controller 600 returns the seat back 12 of the front seat 10, such that the seat back 12 is at the reference angle, by predicting vehicle collision and detecting the rear passenger P. The limit angle may vary based on seat designs and specifications of motors for rotating the seat backs 12 of the front and rear seats 10 and 20 in the seat adjustment unit 400.

Accordingly, when the seat back 12 of the front seat 10 is rotated rearward by an angle greater than the limit angle, the center airbag 500 may interfere with the seat back 12 of the front seat 10 even though the controller 600 rotates the seat back 12 of the front seat 10 in a forward direction before the generation of vehicle collision. Therefore, the controller 600 may be configured to prevent the center airbag 500 from being deployed, thereby preventing the center airbag 500 from striking the passenger P seated in the front seat 10. The controller 600 may further be configured to shorten the deployment time of the center airbag 500 when the seat back 12 of the front seat 10 is inclined forward at an angle greater than the reference angle, and may be configured to delay the deployment time of the center airbag 500 when the seat back 12 of the front seat 10 is inclined rearward at an angle greater than the reference angle.

In other words, since the deployment time of the center airbag 500 is shortened when the seat back 12 of the front seat 10 is inclined forward at an angle greater than the reference angle, the center airbag 500 may first be deployed and then come into contact with the seat back 12 of the front seat 10, thereby enabling the seat back 12 of the front seat 10 to more stably support the center airbag 500. In addition, since the deployment time of the center airbag 500 may be delayed when the seat back 12 of the front seat 10 is inclined rearward at an angle greater than the reference angle, a time for which the angle of the seat back 12 of the front seat 10 is returned to the reference angle may be obtained, with the consequence that it may be possible to prevent the center airbag 500 from interfering with the front seat 10 when the center airbag 500 is deployed.

Meanwhile, the airbag system may include a pre-tensioning unit 700 configured to pull each safety belt of the front and rear seats 10 and 20 in response to a signal received from the controller 600, and the controller 600 may be configured to transmit an operational signal to the pre-tensioning unit 700 to have the safety belt pulled when the vehicle is predicted to collide. Particularly, the pre-tensioning unit 700 may be a device that restricts the passenger P seated in the seat by the safety belt tightened by the driving of a motor, and minimizes damage to the passenger P due to collision by restricting the passenger P in the seat before the generation of vehicle collision when the vehicle is predicted to collide. When the vehicle is predicted to collide, it may be possible to decelerate the vehicle using an active brake system.

Additionally, the airbag system may include a warning notification unit 800 configured to output a collision warning in response to a signal received from the controller 600, and the controller 600 may be configured to provide the passenger P with a warning message using the warning notification unit 800 when the vehicle is predicted to collide. The warning notification unit 800 may be configured to provide a notification to a driver regarding a dangerous situation in various manners such as the operating of warning lamps, the generation of warning sound, and the vibration of belts and steering wheels. Consequently, the driver may recognize and avoid the risk of vehicle collision.

Moreover, the center airbag 500 may be located adjacent to the rear of the seat back 12 of the front seat 10 when the front seat 10 is located at the set position when the center airbag 500 is deployed. Thus, since the center airbag 500 may be located adjacent to the rear of the seat back 12 of the front seat 10, the center airbag 500 may be deployed and may then be supported by the seat back 12 of the front seat 10, thereby preventing the rear passenger P from moving to a front space after pushing the center airbag 500. In addition, it may be possible to effectively absorb an impact applied to the rear passenger P when the rear passenger P comes into contact with the center airbag 500.

The controller 600 may further be configured to operate the seat adjustment unit 400 to move the rear seat 20 rearward when the vehicle is predicted to collide. In other words, when the vehicle is predicted to collide, the position of the front seat 10 and the angle of the seat back 12 may be adjusted, and simultaneously the rear seat 20 may be moved rearward. Consequently, it may be possible to prevent the center airbag 500 deployed in the event of vehicle collision from pressing the rear passenger P moved forward before the center airbag 500 is deployed. Moreover, the above-mentioned inflator provided for deploying the center airbag 500 may be a dual inflator, and the dual inflator may effectively deploy airbags based on multiple collision modes and collision situation. In addition, it may be possible to more effectively absorb an impact since the time for internal pressure maintenance of the center airbag 500 is adjustable.

In accordance with the airbag system for a vehicle having the above-mentioned structure, it may be possible to prevent the passenger P seated in each seat from being struck and injured by a roof airbag, which is also called as a center airbag, when the roof airbag is deployed in the event of vehicle collision. In addition, it may be possible to secure safety by effectively protecting the passenger P using the roof airbag.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An airbag system for a vehicle, comprising:
   a surrounding vehicle detection sensor configured to sense a surrounding vehicle and detect driving information regarding the surrounding vehicle;
   a passenger detection sensor configured to detect whether a passenger or baggage is present in at least one of front seats and rear seats;
   an impact detection sensor configured to detect an impact applied to the vehicle comprising the airbag system;
   a seat adjustment device configured to detect and adjust positions of each of the front seats and the rear seats;
   a center airbag mounted to a roof between the front and rear seats; and
   a controller configured to operate the seat adjustment device to dispose each of the front and rear seats at a predetermined set position when the controller predicts that the vehicle collides based on a signal detected by the surrounding vehicle detection sensor and determines that the passenger or baggage is present in at least one of the rear seats using the passenger detection sensor, and configured to transmit a signal to the center airbag to deploy the center airbag when the controller determines that the impact is applied to the vehicle using the impact detection sensor,
   wherein the predetermined set position is an initial seat design position at which full deployment of the center airbag is not interrupted by any one of the front seats when the center airbag is deployed.

2. The airbag system according to claim 1, wherein the controller is configured to detect the position of the front seats using the seat adjustment device when the vehicle is predicted to collide and the passenger or baggage is located in the at least one of the rear seats, and operate the seat adjustment device to move the front seats to the predetermined set position when the front seats are not located at the predetermined set position.

3. The airbag system according to claim 2, wherein the controller is configured to decrease a deployment time of the center airbag when the front seats are located in front of the predetermined set position, and delay the deployment time of the center airbag when the front seats are located behind the predetermined set position.

4. The airbag system according to claim 2, wherein the controller is configured to pre-store a limit position of the front seats, and transmit a signal to the center airbag to prevent the center airbag from deploying when the front seats are located behind the limit position.

5. The airbag system according to claim 1, wherein:
   the seat adjustment device is configured to detect an angle of each seat back of the front and rear seats to adjust a position of the seat back; and
   when the vehicle is predicted to collide and the passenger or baggage is located in the at least one of the rear seats, the controller is configured to operate the seat adjustment device to adjust the seat back of each of the front seats to a predetermined reference angle.

6. The airbag system according to claim 5, wherein the predetermined reference angle is an initial design angle at which the center airbag does not interfere with the seat back of each of the front seats when the center airbag is deployed.

7. The airbag system according to claim 5, wherein the controller is configured to decrease a deployment time of the center airbag when the seat back of each of the front seats is inclined forward at an angle greater than the predetermined reference angle, and delay the deployment time of the center airbag when the seat back of each of the front seats is inclined rearward at an angle greater than the predetermined reference angle.

8. The airbag system according to claim 5, wherein the controller is configured to pre-store a limit angle of the seat back of each of the front seats, and transmit a signal to the center airbag to prevent the center airbag from deploying when the seat back of each of the front seats is inclined rearward at an angle greater than the limit angle.

9. The airbag system according to claim 1, further comprising:
   a pre-tensioning device configured to pull each safety belt of the front and rear seats in response to a signal received from the controller,
   wherein the controller is configured to transmit an operational signal to the pre-tensioning device to cause the safety belt to be pulled when the vehicle is predicted to collide.

10. The airbag system according to claim 1, further comprising:
    a warning notification device configured to provide a collision warning in response to a signal received from the controller,
    wherein the controller is configured to provide a notification to the passenger of a warning message using the warning notification device when the vehicle is predicted to collide.

11. The airbag system according to claim 1, wherein the center airbag is located adjacent to a rear of a seat back of each of the front seats in a state in which the front seats are located at the set position when the center airbag is deployed.

12. The airbag system according to claim 1, wherein the controller is configured to operate the seat adjustment device to move the rear seats rearward when the vehicle is predicted to collide.

* * * * *